United States Patent [19]

Stanya et al.

[11] 4,343,980

[45] Aug. 10, 1982

[54] CONTROL OF WELDING ENERGY FLUX DENSITY

[75] Inventors: Andrew Stanya, North Royalton; Joseph E. Franklin, Medina; David W. Dickinson, Hinckley, all of Ohio

[73] Assignee: Republic Steel Corporation, Cleveland, Ohio

[21] Appl. No.: 136,518

[22] Filed: Apr. 2, 1980

[51] Int. Cl.³ .............................................. B23K 11/24
[52] U.S. Cl. ..................................... 219/110; 219/109
[58] Field of Search ........................ 219/108, 109, 110

[56] References Cited

U.S. PATENT DOCUMENTS

| | | | |
|---|---|---|---|
| 3,191,441 | 6/1965 | Erickson | 219/110 |
| 3,518,395 | 6/1970 | Vanderhelst | 219/110 |
| 3,546,421 | 12/1970 | Meyer et al. | 219/110 |
| 3,558,849 | 1/1971 | Catherall | 219/110 |
| 3,582,967 | 6/1971 | Beckman et al. | 219/110 |
| 3,609,285 | 9/1971 | Scarpelli et al. | 219/109 |
| 3,612,811 | 10/1971 | Lifshits et al. | 219/100 |
| 3,748,431 | 7/1973 | Melbard et al. | 219/110 |
| 3,980,857 | 9/1976 | Sciaky | 219/110 |
| 4,024,371 | 5/1977 | Drake | 219/110 |

FOREIGN PATENT DOCUMENTS 647083 2/1979 U.S.S.R. ............................ 219/110

Primary Examiner—C. C. Shaw
Attorney, Agent, or Firm—Watts, Hoffmann, Fisher & Heinke Co.

[57] ABSTRACT

An electrical resistance spot welding system and method is disclosed. The system has adjustable output power circuitry for applying electrical heating energy to a weld site by way of weld tips, in accordance with a welding operation. An energy monitor senses instantaneous accumulated energy applied during the welding operation, and terminates the operation when an adjustable predetermined total energy has been applied. Other circuitry monitors applied welding voltage, and derives therefrom a signal which is a function of the energy density per unit area applied at the weld site. Circuitry responds to the energy density sensing to control the energy monitor and the power circuitry to govern the total energy applied in the welding operation. As weld energy flux density decreases, such as happens when weld tips spread or "mushroom", total applied energy is increased, compensating for weld tip changes, thereby holding the amount of applied energy per unit of weld site area relatively constant from one welding operation to another.

13 Claims, 1 Drawing Figure

CONTROL OF WELDING ENERGY FLUX DENSITY

BACKGROUND OF THE INVENTION

1. Field of the Invention

This invention pertains to the welding art, and more specifically to means associated with an electric resistance spot welding system for holding relatively constant the energy flux density applied to weld sites during each of a succession of similar welding cycles.

2. Description of the Prior Art

Many systems have been proposed and used over the last century for accomplishing electrical resistance spot welding of workpieces. This type of welding is often used in conjunction with the manufacture of large metal assemblies, such as automotive bodies.

Electrical resistance spot welders include electric AC power supply circuitry capable of furnishing high current, low voltage AC electrical heating energy to the workpieces. The power is applied to the workpieces by way of electrodes comprising elongated welding tips, often made of copper alloy, which, due to their expendable nature, are removably couplable to the power circuitry. Typically, and electric spot welder is capable of applying serveral thousand amperes (amps) of current to the workpieces between the welding tips, at a potential in a range of approximately 1.5 to 6 volts at a power of about 12–25 kilowatts, for a weld cycle duration of about 0.2 to 0.4 seconds.

In spot welding systems, power is supplied to the welding tips by means of power modulating tubes known as "Ignitrons". The Ignitrons are often connected in anti-parallel, to produce a full wave AC output. Manual or automatic adjustments in the power and current produced by the power supply are made by adjusting the portion of the AC cycle during which each of the Ignitrons transmits power. As the Ignitrons are adjusted to transmit power over a comparatively larger portion of the Ac cycle, the applied power naturally rises.

Before performing a series of welds, spot welders must be manually set up. In the setup procedure, an operator performs a succession of sample welds, adjusting the applied power upwardly in steps. At some point, the applied power becomes so great that metal in the weld site area is actually blown out of the site, and an imperfect weld is obtained. This phenomenon is known as "expulsion". When expulsion occurs, the operator performing the setup procedure then knows that the applied power may be excessive and reduces the power slightly, in hopes of obtaining welds with the maximum amount of power applicable without provoking expulsion.

A typical electrical resistance spot welding system is exemplified by:

Spot welding systems of the type described above have been generally successful in welding common cold rolled steels. Such steels have a relatively wide tolerance range for welding energy, within which good quality welds can be obtained. Newer types of steels, however, coming into increasing demand, have a much narrower welding energy tolerance range within which good welds of such products can be obtained. Such products include many coated steels such as steels to which zinc is applied, either by electrode position or by dipping, in order to inhibit corrosion. These corrosion resistant coated steels are the subject of increasing demand particularly in the automotive industry, where manufacturers wish to provide broader warranties against auto body corrosion.

Spurred by the consequent demand for more precise welding energy control for coated products, many have proposed automatic energy control systems for welders. In one such system, an integrating energy monitor is employed. The energy monitor is coupled to the welding power circuitry, and responds to welding current and voltage to instantaneously integrate the amount of power applied during a welding cycle. The energy monitor thus produces a signal which indicates the instantaneous value of accumulated energy which is applied in a welding cycle.

A comparator is provided for comparing integrated energy in a weld cycle with a predetermined desired value. When the comparator circuitry senses that the predetermined energy value has been reached, it actuates circuitry for terminating the welding cycle.

An automatic welding control system incorporating an energy monitor and comparison circuitry is described in U.S. Pat. No. 4,101,753, to Buff et al, issued July 18, 1978, and entitled Flash Welding Apparatus and Method, the disclosure of which is expressly incorporated herein by reference.

Further work on improving weld consistency, a continuing problem, has been done based on empirical bases and assumptions. This work has mainly comprised an increase of operator intervention in the welding process and monitoring of welding current.

In spite of more precise welding energy control, there remain difficulties in obtaining consistently good welds over a long succession of weld cycles, particularly with the coated steel products referred to above. While the specific cause of these problems has not apparently been identified, some of them have been vaguely attributed to progressive deterioration of the weld tips which normally occurs with use.

One of these undesirable changes is known as "mushrooming" of the tips. As a tip is used to weld a coated steel product, it accretes coating material, and can actually alloy with it. In the case of welding zinc coated steel, successive welding operations can result in the accumulation of so much zinc on the tip that it alloys with the copper of the tip, and forms a generally enlarged rounded brass surface at the end of the tip. Other undesirable changes which have been thought to adversely affect welding are tip end changes which can result merely from the heating action of the welding, in which portions of the tip break away.

In order to combat weld nonuniformity, manufacturers have resorted to frequent visual inspection and replacement of weld tips by operating personnel. Additionally, sample welds are broken apart at regular intervals and visually inspected in order to ascertain whether welding quality is being maintained.

Both of these techniques are labor-intensive.

The tip and weld inspection problem is exacerbated in circumstances involving the use of so-called "robot" welding systems, which can perform multiple welds at very high rates. With higher rates of welding, weld tip deterioration occurs more rapidly, and the need for frequent visual inspection and sample checks becomes even more critical.

Welding current monitoring has been generally ineffective in ameliorating weld inconsistency.

It is therefore a general object of this invention to provide a spot welding system capable of making long successions of good quality spot welds on steel products having a relatively narrow weld energy tolerance without the need excessively frequent weld tip replacement and/or inspection.

SUMMARY OF THE INVENTION

The inventors have overcome or sharply reduced the above explained difficulties in accomplishing consistently good welds automatically, and with minimal operator intervention, on steels having a relatively narrow welding energy tolerance. This advance has been accomplished in part by recognition and articulation of the cause of persistent weld nonuniformity which occurs in spite of precise energy control.

More specifically, the inventors have discovered that the quality of spot welds is determined not only by the total energy applied during each welding cycle, but also by the energy flux density applied to the weld site. Thus, mere energy control is insufficient.

For the purposes of this document, the term "energy flux density" shall mean the average amount of heating energy applied per unit area of the weld site.

The importance of this parameter becomes apparent upon consideration of the following hypothetical. Assume the use of one of the prior art proposed welding systems incorporating an energy monitor for terminating the welding cycle upon the application of a predetermined amount of energy during the cycle. When new weld tips are used, and the area of their energy application to the weld site is known, such a system may work well, for it can be calibrated to provide a correct amount of energy for accomplishing a weld over the known weld site area. If, however, the weld tips deteriorate such that their effective energy application area increases, as by mushrooming, simple control of energy will not prevent weld inconsistencies.

Since the weld site area has increased, the energy to the weld, which is limited to a predetermined amount of the energy monitor, is distributed over a larger weld site area. Thus, the energy applied per unit of weld site area will drop substantially, although the energy monitor would still apply the same amount of total energy during the cycle. This reduction in energy flux density during the weld cycle deprives all portions of the weld site area of the proper energy flux density application. Therefore the weld is likely to be unacceptable.

The present invention is designed to provide a welding system and method embodied by circuitry and apparatus which not only controls total energy to the weld, but also controls to a relative constat the energy flux density applied to the weld.

A more specific embodiment of such a welding system includes power circuitry couplable by way of weld tips for delivering electrical welding energy to a weld site. An integrating energy monitor is coupled to the power circuitry for sensing instantaneous current and voltage applied across the weld, and for integrating with time the total energy applied during the weld cycle. Compensating circuitry, also coupled to the power circuitry, senses the energy flux density of the weld. The compensating circuitry, in response to sensed energy flux density, controls the power circuitry and energy control systems to maintain the energy flux density of the weld at a relatively constant value, irrespective of a range of changes in weld tip configuration.

In accordance with a more specific aspect of the invention, it has been found that a satisfactory representation of the energy flux density applied to the weld can be derived from the electrical potential across the weld tips.

In accordance with another specific aspect of the invention, the present welding system is provided with means coupled between the compensating circuitry and the power circuitry for adjusting the power circuitry to change the rate of power application in stepwise fashion as a partial means of compensating for changes in sensed energy flux density. The compensating circuitry also comprises additional circuitry for adjusting the amount of total energy applied in the weld in accordance with the need for maintaining a relatively constant energy density.

In accordance with a still more specific aspect of the invention, the welding system having stepwise adjustment capability is further provided with means for producing an indication when a predetermined number of said stepwise adjustments have been made. This feature enables the system to indicate the desirability of visually checking weld tip condition, after enough stepped corrections have been made to suggest that the weld tips may need replacement.

In accordance with another aspect of the invention, an electrical resistance spot welding system is provided having power circuitry for applying electrical energy to a weld site by way of weld tips. An energy monitor senses instantaneous current and voltage across the weld tips, and provides an instantaneously integrated signal indicating total energy accumulated in the weld cycle. A comparator receives the integrated instantaneous energy signal, and compares it with a predetermined value stored therein. When the energy reaches the predetermined value, the welded cycle is terminated.

Compensation circuitry produces a signal which is a function of the weld site area and hence of the energy flux density applied. The compensation circuitry, in response to the sensing of weld site area, controls the power circuitry and the energy monitor to maintain the energy flux density at a relatively stable level during each of a succession of weld cycles.

In accordance with still another aspect of this invention, the compensating circuitry senses the resistance across the weld tips, and therefrom produces a compensating control signal which is a function of energy flux density.

The particulars of this invention will be understood in more detail by reference to the following detailed description and to the drawing, in which:

DESCRIPTION OF THE PREFERRED EMBODIMENT

Figure 1:
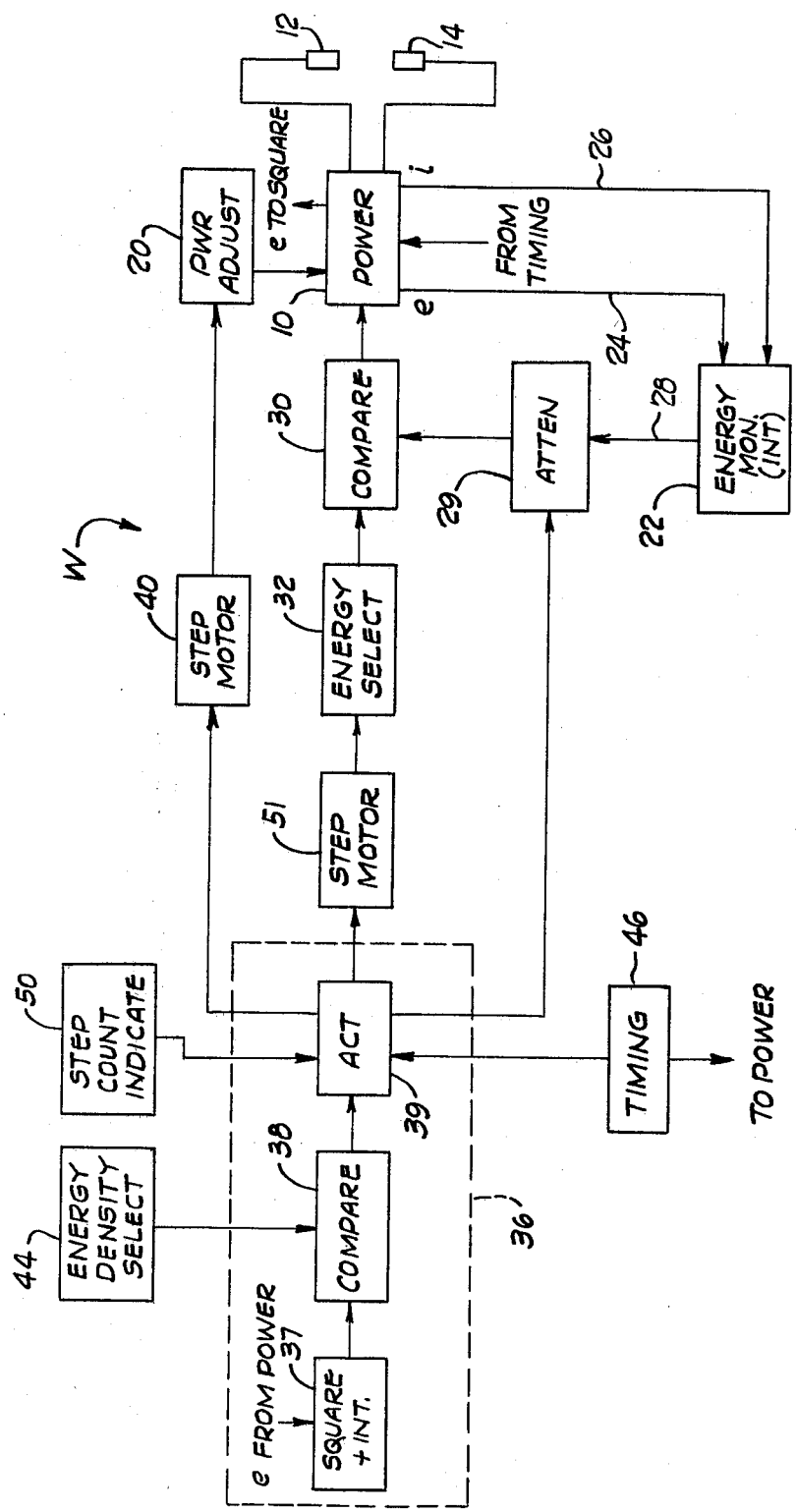
FIG. 1 is a block diagram illustrating a welding system incorporating the invention herein described.

FIG. 1 shows a welding system W incorporating the present invention. Central to the system W is power circuitry 10 which applies electrical heating energy in a repeatable weld cycle to workpieces (not shown) located between welding electrodes 12, 14 coupled to the power circuitry by way of electrical cables 16, 18. The power output of the power circuitry 10 is manually adjustable by way of power adjustment circuitry 20 appropriately coupled to the power circuitry. Other circuitry described below controls total energy applied, as well as energy flux density.

An energy monitor 22 receives from the power circuitry instantaneous values of the welding voltage and current across the electrodes, by way of leads 24, 26, respectively. The energy monitor 22 produces an output signal over a lead 28 which is a function of the total time integrated electrical energy applied across the electrodes during the welding cycle. A comparator 30 receives this integrated energy representation signal by way of an adjustable attenuator 29 and causes the power circuitry 10 to terminate the welding cycle when a predetermined amount of energy has been applied during the cycle. The predetermined accumulated energy total at which the weld cycle is terminated is preset by means of an electrical signal produced by an adjustable energy select circuit 32 which can suitably be a potentiometer.

The power circuitry 10 and its associated connections to an AC electrical power source and the like for applying welding energy to the electrodes 12, 14, is suitably comprised of a known electric resistance spot welder, model ENC 12-75 KVA manufactured by Taylor-Winfield. The power circuitry 10 is capable of delivering AC electric power to the electrodes with a current flow rate of several thousand amperes, and at a voltage of between about 1.5 to 6 volts. The energy monitor 22, comparator 30, and energy select circuitry 32 are suitably comprised by a combination of Models 901, 903, and 902, Part Nos. M228, M227, and M226, respectively, manufactured by Wean United Company, of Youngstown, Ohio, and by associated interfacing circuitry disclosed in the Buff et al patent previously incorporated by reference.

The electrodes 12, 14 comprise elongated weld tips made primarily of copper. The electrodes are susceptible of change and deterioration in use such that the effective weld site area defined by the geometrical configuration of the ends of the weld tips varies during the useful life of the tips, generally increasing the weld site area as the tips are used. This phenomenon occurs particularly when spot welding coated steel products, because the coating tends to accumulate on the ends of the weld tips, and often alloys with their copper. For example, when welding zinc coated steels, the copper of the tips alloys with the zinc of the coating and forms an accumulation of brass near the end of the weld tip. This phenomenon is known as "mushrooming".

When weld tips mushroom, and increase the weld site area, previously energy monitored welded systems can fail to weld properly. As a uniform amount of energy is distributed over a progressively larger weld site area, the integrated amount of energy applied per unit of weld site area decreases, and can become insufficient to make good welds. Thus, as mushrooming occurs, the typical energy monitored system actually works against itself by faithfully holding energy constant, which causes an undesirable decrease in energy flux density over the weld.

An important aspect of this invention is to provide the welding system with circuitry for compensating for increases in weld site area, in order to hold relatively constant the energy flux per unit area from one similar weld cycle to another.

Implicit in this invention is the recognition that it is insufficient to control merely the total energy applied in a weld cycle, irrespective of how precise the total energy control may be. Rather, it is also necessary to make adjustments in total energy to take into account changes in weld site area, in order to maintain the energy flux density over the weld area reasonably uniform.

In the present system, the energy compensation means comprises compensation circuitry 36, energy density select circuitry 44, and a stepping motor 40 coupled between the compensation circuitry and the power adjustment circuitry 20. The compensation circuitry includes squaring and integrating circuit 37, a comparator 38, and actuator circuitry 39. The squaring circuit receives as one input the instantaneous voltage across the weld during each weld cycle. It generates a signal having a component which is a square of the voltage. This squared signal is integrated for each weld cycle. For reasons explained in more detail below, this signal comprises a representation of the energy flux density being applied at the weld site.

Note that, while the weld voltage is AC, the time integral of the squared voltage has a measurable DC component.

The compensation circuitry 36 also includes a comparator 38 which compares the detected energy density, as expressed by the integrated output of the squaring circuit, with a representation of a predetermined energy flux density constituting the output of the energy density select circuitry 44, e.g., a manually adjustable potentiometer. Timing circuitry 46, coupled to sense actuation of the power circuit 10 to begin a weld cycle, actuates the comparator of the compensation circuitry to integrate, and to compare the integrated weld voltage output squared signal with the selected energy density signal during each weld cycle. Each time the integrated energy flux density is detected as below the predetermined density, actuator circuitry coupled to the comparator causes the stepping motor 40 the mechanically raise the power setting of the power adjust circuitry 20 to raise the amount of power applied by the welder in subsequent weld cycles.

More specifically, it is believed that stepwise advances of between $\frac{1}{2}$ degree and 3 degrees of the rotatable power adjust dial, representing power increases of about 1% each, are suitable for accomplishing this control function.

In addition to raising the rate of power application in response to falling weld energy density, the compensation circuitry also raises the total energy applied in the welding cycle. This can be done in any of a variety of ways, depending upon specific circumstances. For example, the comparator output can be used with another stepping motor 51 to adjust upwardly the predetermined total energy signal called for by the energy select circuitry 32, (e.g., a mechanically adjustable potentiometer). A suitable adjustment is believed to be embodied in raising the total energy in stepwise increments of approximately 1%, each time insufficient energy flux density is detected. The maintenance of the adjustments helps prevent energy overshoot, and obviates necessity for any reduction of power.

Alternately, the comparator output can be directed to the attenuator 29 interposed between the energy monitor 22 and the comparison circuitry 30, in order to adjustably lower artificially the output of the energy monitor presented to the comparator 30, in predetermined steps, of approximately 1% each. This adjustable attenuation will cause the energy monitor 22 to appear to represent the accumulation of less energy in the weld cycle that has actually been applied, and will thereby effectively increase the amount of energy applied in each weld cycle.

Preferably, the increase in total energy corresponding to each power increase should be just enough to maintain the weld cycle time constant, so that, for reasons explained in more detail below, weld energy flux density can continue to be relatively represented solely as a function of the welding voltage.

Clearly, as a matter of choice, one could adjust the power application of the total energy application equivalently in a continuous or gradual fashion, rather than the stepwise fashion presently indicated and believed preferred.

Alternately, one could theoretically omit the power adjustment aspect, and control total weld energy flux density by merely adjusting the energy monitoring circuitry as described above to permit greater energy in each weld cycle. This technique, however, would necessitate the extension of the duration of the weld cycles in order to accommodate changes in total integrated energy flux density. While this may not be a disadvantage in many circumstances, the excessive extension of welding cycle time can interfere with manufacturing processes which, for example, are carried out automatically or on a scheduled production line. The added use of the technique for raising the power as well as the energy applied allows for greater energy application without disturbing the timing of weld making.

Moreover, if weld cycle time were allowed to fluctuate, one would have to detect energy density (weld area) in a more direct fashion, as by representing weld resistance by a ratio of current and voltage, rather than by the simpler technique of using voltage alone.

An important aspect of this invention is the recognition of the fact that, under proper conditions, the energy flux density per unit of weld area is properly representable as a function of only the voltage across the weld. As explained in more detail below, this discovery also depends upon the implicit recognition that a spot welding system resembles a current source much more closely than it does a voltage source. Thus, as the weld site area increases, and resistance across the weld falls correspondingly, the current applied will tend to remain constant, while the voltage will be predominantly reduced. Since a spot welder resembles a current source, for a fixed power setting, efforts to control welding by current monitoring have not had much effect.

A mathematical derivation of the relationship between the time integral of the square of welding voltage E, and energy flux density, is given below:

Let the total energy flux density per unit area be expressed as W/A, where W is the total energy applied in the weld cycle and A is the weld site area.

(1) $W/A = EIT/A$, where I is the average total welding current, and T is the duration of the weld cycle, T being held a constant.

The resistance R across the weld, for a given workpiece material and given weld tips, can be expressed by k/A which in turn is equal to E/I.

Solving for A, it is found that $A = kI/E$.

Substituting this value for A in equation (1), the following relationship becomes apparent:

$$W/A = E^2 T/k.$$

For a given weld material and fixed weld cycle duration, T and k are both constant, it is apparent that the energy flux density is a function of the square of the voltage across the weld. This recognition greatly facilitates determination and monitoring of the weld energy flux density per unit of weld site area.

While adjustment for energy density is believed accomplished within practical limits by the use of the representation of the squared welding voltage signal, other linear correction can be made in supplemental fashion to account for not only the area of the weld site, but also its circumference. Such further compensation can correct for energy losses not dissipated in the weld itself, such as copper losses in the electrodes, and heat conduction losses away from the weld.

Optionally, a step counter 50, coupled to the step actuator circuitry 39, can be employed. The step counter records the number of steps adjustments executed, and provides an indication, such as turning on a lamp, when a predetermined number of steps has been performed. This provides an operator with a warning that many adjustments have been made, and that weld tips may need replacement. The counter can be reset when replacement is made.

It is to be understood that the disclosure of this embodiment is intended as illustrative, rather than exhaustive, of the present invention. It should be recognized that those of ordinary skill in the relevant art may be able to make additions, deletions or changes in the specific embodiments of this invention without departing from its spirit or scope, as expressed in the following claims.

We claim:
1. A welding system comprising:
    (a) apparatus including electrodes and power circuitry for applying heating energy to a welding site to effect a weld between two workpieces in accordance with a cyclically repeatable welding process;
    (b) means for monitoring the amount of heating energy applied in the welding process;
    (c) circuitry for producing an electrical signal which is a function of the energy density applied per unit weld site area, said signal being a function of substantially only the voltage between the electrodes and
    (d) circuitry responsive to said electrical signal for controlling the amount of energy per unit weld site area applied by the power circuitry during a weld process cycle.

2. An electrical resistance spot welding system comprising:
    (a) means including power circuitry coupled to weld tips for applying heating energy to a weld site for welding workpieces together in accordance with a welding cycle;
    (b) means for monitoring the instantaneous accumulated value of heating energy applied to the weld site during the welding cycle and for terminating the weld cycle when a predetermined amount of energy is applied;
    (c) circuitry for monitoring the instantaneous value of electrical potential between the weld tips, and
    (d) circuitry coupled to one of the terminating means and power circuitry and responsive to the monitored potential and independent of welding current for controlling the application of heating energy to the weld site during a welding cycle as a function of the monitored potential, said function defining a relationship between applied energy and monitored potential wherein, over a range, the energy applied becomes greater as the monitored potential becomes lesser.

3. The system of claim 2, wherein:
said control circuitry includes means for increasing the amount of energy applied in the welding cycle by increasing the power applied to the weld site.

4. The system of claim 3, wherein:
the control circuitry further includes means for increasing the amount of energy applied during the weld cycle by increasing the duration of the weld process.

5. An electrical resistance spot welding system including power circuitry adaptable for delivering electrical welding energy for spot welding workpieces together in weld cycles by way of welding tips having a susceptibility to deterioration with use, said spot welding system comprising:
(a) a total energy monitor coupled to the power circuitry and including circuitry for sensing the instantaneous accumulated value of energy applied to the weld site during each said welding cycle and energy select and comparator circuitry for controlling energy application as a function of the monitored total accumulated energy;
(b) an energy density monitor responsive to the electrical potential across the weld tips, and actuator circuitry responsive to the energy density monitor for controlling the power circuitry for compensating for deterioration of said weld tips by increasing the power applied in a weld cycle in response to a decrease in electrical potential across the weld, for maintaining a relatively constant total energy flux density delivered to the weld site during each of a succession of weld cycles during which the weld tips suffer change.

6. The system of claim 5, wherein said power circuitry includes means for adjusting the amount of power supplied to the weld site, and said control means comprises:
(a) means for comparing the sensed electrical potential across the weld tips to a predetermined standard, and
(b) apparatus and circuitry for increasing power applied to the weld site in stepwise fashion, each step increase being responsive to the detection of the weld tip potential difference having a value during a weld cycle lower than the predetermined value.

7. The system of claim 6, further comprising: means for providing a tangible indication of the execution of a predetermined number of said stepwise adjustments in welding power.

8. A cyclically operable system comprising:
(a) power circuitry for applying welding energy to weld sites on workpieces;
(b) circuitry for controlling welding energy via the power circuitry;
(c) circuitry for detecting energy applied per unit of weld site area, and
(d) compensation circuitry responsive to the energy per unit area detection for influencing the energy control circuitry to maintain energy per unit area at a substantially constant level for each of a succession of weld cycles.

9. A welding system comprising:
(a) power circuitry for applying welding energy in cycles to weld sites on workpieces;
(b) circuitry for controlling welding energy via the power circuitry;
(c) circuitry for detecting weld energy flux density during, a first weld cycle and
(d) compensation circuitry responsive to the weld energy flux density detection for influencing the energy control circuitry to maintain energy flux density during each of a subsequent succession of weld cycles at substantially the same level as that of the first cycle.

10. A welding system comprising:
(a) power circuitry for applying welding energy to workpieces to execute weld cycles;
(b) circuitry for controlling welding energy via the power circuitry;
(c) circuitry for producing an energy density signal which is a function of the integral of the squared voltage across the weld, and
(d) compensation circuitry responsive to the energy density signal for controlling energy flux density during a succession of weld cycles.

11. A welding system comprising:
(a) apparatus for applying electrical heating energy to a succession of weld sites to effect welding between workpieces according to a weld process;
(b) a monitor for measuring a parameter of each weld;
(c) apparatus and circuitry responsive to the monitor for adjusting a weld parameter in steps after each weld in which said monitored parameter is outside a predetermined range, and
(d) means for indicating when a predetermined number of said step adjustments has occurred.

12. A welding control method comprising the steps of:
(a) applying heating energy to a succession of welding sites by way of weld tips in order to weld workpieces together in accordance with a succession of welding operations;
(b) monitoring a parameter of each said welding operation indicating the degree of mushrooming of the weld tips;
(c) adjusting in steps a welding parameter in response to said monitoring step for each weld in which the monitored parameter is outside a predetermined range, and
(d) producing an indication of the occurrence of a predetermined number of said step adjustments indicating the total amount of mushrooming of the weld tips.

13. A welding system comprising:
(a) means for applying heating energy to effect welds between workpieces in accordance with a series of welding operations;
(b) means for monitoring a parameter of each welding operation;
(c) means responsive to the monitoring means for adjusting a parameter of the welding operation in stepwise fashion, after each weld operation in which the monitored parameter is outside a predetermined range, and
(d) a device for providing an indication of the occurrence of a predetermined number of said stepwise adjustments.

* * * * *

UNITED STATES PATENT AND TRADEMARK OFFICE
CERTIFICATE OF CORRECTION

PATENT NO. : 4,343,980

DATED : August 10, 1982

INVENTOR(S) : Andrew Stanya, Joseph E. Franklin and David W. Dickinson

It is certified that error appears in the above-identified patent and that said Letters Patent is hereby corrected as shown below:

Column 1, line 25, "and" should be --an--;
Column 3, line 53, "constat" should be --constant--;
Column 5, line 50, "welded" should be --welding--;
Column 6, line 36, "the" should be --to--;
Column 8, line 15, "steps" should be --step--.

Signed and Sealed this

Seventh Day of December 1982

[SEAL]

Attest:

GERALD J. MOSSINGHOFF

Attesting Officer  Commissioner of Patents and Trademarks